(12) United States Patent  (10) Patent No.: US 6,619,118 B1
Keck  (45) Date of Patent: Sep. 16, 2003

(54) MONITORING SYSTEM (75) Inventor: James C. Keck, Andover, MA (US)

(73) Assignee: SepSensor Inc., Andover, MA (US)

( * ) Notice: Subject to any disclaimer, the term of this patent is extended or adjusted under 35 U.S.C. 154(b) by 0 days.

(21) Appl. No.: 10/132,581

(22) Filed: Apr. 25, 2002

(51) Int. Cl.⁷ .......................... G01F 23/00; G01F 23/20
(52) U.S. Cl. ....................... 73/304 C; 73/290 C; 210/86
(58) Field of Search ........................... 210/86, 744, 746; 73/290 R, 304 C, 64.55

(56) References Cited

U.S. PATENT DOCUMENTS

| 3,025,962 A | * | 3/1962 | Williams ..................... 210/86 |
| 3,792,347 A | | 2/1974 | Hawley |
| 3,923,655 A | * | 12/1975 | McKinney ................... 210/742 |
| 4,121,094 A | * | 10/1978 | DiVito et al. .................. 377/24 |
| 4,345,204 A | | 8/1982 | Shelley |
| 4,441,362 A | | 4/1984 | Carlson |
| 4,680,475 A | | 7/1987 | Tansony et al. |
| 4,973,970 A | * | 11/1990 | Reeser ........................ 342/357 |
| 4,974,446 A | | 12/1990 | Vigneaux |
| 5,076,100 A | * | 12/1991 | Hunter et al. ............. 73/290 V |
| 5,121,340 A | | 6/1992 | Campbell et al. |
| 5,563,845 A | | 10/1996 | Walsh |
| 5,604,582 A | * | 2/1997 | Rhoads et al. ................. 356/73 |
| 5,698,775 A | | 12/1997 | Philip et al. |
| 5,736,637 A | | 4/1998 | Evans et al. |
| 5,946,967 A | | 9/1999 | Russell |
| 6,012,020 A | * | 1/2000 | Gardell et al. ................ 702/50 |
| 6,217,752 B1 | * | 4/2001 | Coots ........................... 210/86 |

* cited by examiner

Primary Examiner—Hezron Williams
Assistant Examiner—Katina Wilson
(74) Attorney, Agent, or Firm—O'Connell Law Firm

(57) ABSTRACT

A monitoring system such as a septic tank monitoring system for distinguishing between and identifying the location of a sedimentary layer, a scum layer, and any intervening liquid zone in a septic tank with an elongate sensing probe for being disposed in the septic tank, a plurality of sensors disposed along the sensing probe, and a remote monitor operably associated with the plurality of sensors for providing a remote indication to a septic tank operator of the location of the sedimentary layer, the scum layer, and any intervening liquid zone in the septic tank based on the signals from the plurality of sensors so that a septic tank operator can monitor the contents and condition of the septic tank without a need for excavating and physically inspecting the septic tank.

44 Claims, 8 Drawing Sheets

FIG.7A  SPHERICAL ELECTRODE

FIG.7B  RING ELECTRODE

FIG.8A  SPHERICAL ELECTRODE

FIG. 8B  RING ELECTRODE

MONITORING SYSTEM

FIELD OF THE INVENTION

The present invention relates generally to measuring and testing methods and instruments. Stated more particularly, this patent discloses and protects a system and method for monitoring conditions within a container, such as the thickness and position of scum and sludge layers within a septic tank.

BACKGROUND OF THE INVENTION

As one knowledgeable in the art will be well aware, a typical septic system is founded on a tank in which wastes are collected, settled, and partially digested. The septic tank leeches what is termed gray water into a drain field where it is dispersed. When the system is operating properly, the dispersed gray water will be substantially devoid of solid matter. When the system is not operating properly and solids are suspended in the gray water, the drainage field can become clogged by solids such that the gray water ceases to be absorbed and dispersed properly thereby resulting in drainage field failure. With this, ground and surface water can become polluted, and the system can otherwise malfunction.

When operational, a septic tank has three biologically active zones that are commonly referred to as an upper, cake or scum layer, a middle, liquid zone, and a bottom, sedimentary or sludge layer. Waste matter enters the liquid zone at the middle of the tank. The sedimentary layer is formed as heavy solids settle to the bottom of the tank as sediment, or sludge, where they are further decomposed. Some of the sediment, however, will not be biodegradable and will remain at the bottom of the tank. The cake layer is formed as fats and other lighter suspended solids rise to the top of the tank where they too may further decompose.

During proper septic tank operation, only material from the liquid zone is dispensed to the drainage field. The effective volume and rate of flow of the tank determine the tank's settlement rate. The volume of the tank's liquid zone, therefore, is considered the tank's effective volume. In turn, that effective volume is used to determine the fixed design capacity of the tank, which is measured as the ability of the tank to process a particular flow rate of material. With this, the tank will be unable to process material entering the system at an inflow rate over the maximum allowable flow rate.

A septic tank's system capacity, on the other hand, is condition dependent in that it is indicative of the system's ability to continue to process material. The tank's system capacity falls to zero when, for example, particles of the sedimentary or cake layers begin to escape from the tank to the drainage field or the sedimentary and cake layers become so close to one another that the liquid layer is nearly or completely extinguished.

Advantageously, as a result of anaerobic decomposition in the upper and bottom layers, the increase in thickness of the sedimentary and cake layers is substantially less than the rate at which corresponding solids are input into the system. Nonetheless, the bottom, sedimentary or sludge layer and the upper, scum or cake layer do tend to increase progressively in thickness during normal operation of the septic system such that the accumulated solids must eventually be pumped from the system.

Common practice suggests that this pumping be carried out when the volume of the middle liquid zone is reduced to roughly one-third of the total height of the three layers. When that need for pumping will be reached, however, is dependent on the mix and overall volume of waste that is input to the system and the effectiveness of the biological decomposition occurring in the septic tank.

Pumping may be considered necessary based on the absolute location of the top layer, the absolute location of the bottom layer, or a combination of these factors that have reduced the volume of the middle, liquid zone to a given extent. Notably, as the volumes of solids increase in the septic tank, the effectiveness of the biological decomposition tends to increase thereby leading to a decreased rate of accumulation even with a constant input rate. With this, it will be appreciated that the required pumping interval is substantially unpredictable and can range from as little as two years to as much as fifteen years and longer.

A major difficulty in septic tank operation is that, because it is necessarily carried out underground, the status of the septic tank is generally difficult or impossible to perceive. With this, the first indication of a failure in the system often comes in the form of the unpleasant backup of waste material into the associated home or building. Even more disadvantageously, this backup occurs typically well after the system has begun to discharge substantial solids into the drainage field.

Advantageously, a number of methods and systems have been disclosed by the prior art for providing an indication as to whether a given septic system is in need of pumping. One most basic means is by digging up and removing the access cover for the tank and dipping what is termed a flapper stick into the tank to gain an estimation of the height of each of the layers. As one will appreciate, this is a cumbersome and unpleasant practice and is often done merely to confirm that an already-occurring failure is in fact due to a need for pumping.

Other systems have been disclosed that are intended to allow a septic tank operator to monitor the contents of the tank without the need for manually opening the tank and interacting with its contents. For example, relatively simple mechanical devices have been disclosed wherein, for example, a float within the tank is coupled to an arm that projects from the tank to indicate the status of one or more layers within the tank. Other, more complex systems have been disclosed with elongate sensing probes for being permanently disposed in a septic tank. Sensors disposed along the probes have been of a wide variety of types including sonic sensors, light emitting and detecting sensor combinations, electrical resistance sensors, and still other sensor arrangements.

Unfortunately, even these improved systems and arrangements have left septic tank operators with a number of disadvantages and shortcomings. By way of example and not limitation, one knowledgeable in the art will be aware that many prior art systems are vulnerable to malfunction and fouling as they spend years disposed within a septic tank. Furthermore, prior art systems often are incapable of providing the septic tank operator with consistently accurate information regarding the status of the contents of the septic tank. Still further, some systems are simply incapable of taking accurate readings or readings of sufficient resolution while others additionally or alternatively cannot relay taken readings accurately or with sufficient resolution from the system to the operator. In light of these and further disadvantages of the prior art, it becomes clear that there remains a need for a septic tank monitoring system and method that overcomes these and other shortcomings of the prior art while providing a number of heretofore unrealized advantages thereover.

SUMMARY OF THE INVENTION

Advantageously, the present invention has as its primary object the provision of a system and method for monitoring the condition of stratified layers in a container, such as a septic tank, that meets each of the needs that the prior art has left unmet while providing a number of further advantages thereover.

More particularly, a most basic object of the present invention is to provide a septic tank monitoring system that can function accurately in distinguishing between and identify the location of a sedimentary layer, a scum layer, and any intervening liquid zone in a septic tank.

Another fundamental object of the invention is to provide a septic tank monitoring system that can operate consistently and without malfunction over extended time periods by resisting fouling and similar negative effects.

Yet another object of certain embodiments of the invention is to provide a septic tank monitoring system that can be readily installed relative to a septic tank without a need for tools or attachment hardware.

Still another object of particular embodiments of the invention is to provide a septic tank monitoring system that relays information regarding the status of the septic tank to a septic tank operator in a clear and readily understood format.

These and ftirther objects and advantages will become obvious not only to one who reviews the present specification and drawings but also to one who has an opportunity to make use of an embodiment of the present invention for a septic tank monitoring system.

In carrying forth the foregoing objects, one embodiment of the monitoring system comprises a septic tank monitoring system that distinguishes between and identifies the location of a sedimentary layer, a scum layer, and any intervening liquid zone in a septic tank by incorporating an elongate sensing probe for being disposed in the septic tank, a plurality of sensors disposed along the sensing probe each including a means for providing a signal that enables a determination of whether the sensor is disposed proximal to the sedimentary layer, the scum layer, or any intervening liquid zone in the septic tank, and a remote monitor operably associated with the plurality of sensors for providing a remote indication of the location of the sedimentary layer, the scum layer, and any intervening liquid zone in the septic tank based on the signals from the plurality of sensors. Under even this basic arrangement, the septic tank monitoring system advantageously enables a septic tank operator to monitor the contents and condition of the septic tank without a need for excavating and physically inspecting the septic tank.

The elongate sensing probe could, for example, comprise an elongate tube. A retaining member can be slidably associated with the elongate tube and biased toward an extended position so that the sensing probe can be inserted into and retained in the septic tank by compressing the retaining member, orienting the elongate sensing probe preferably generally vertically in the septic tank, and allowing the retaining member to decompress. With this, the sensing probe can be frictionally retained in the septic tank with the first end of the elongate sensing probe frictionally engaging a first boundary of the septic tank, such as the top of the tank, and the second end of the elongate sensing probe frictionally engaging a second boundary of the septic tank, such as the bottom of the tank.

To prevent damage to the components housed therein, the elongate tube preferably will be sealed to prevent liquids and solids from entering the elongate tube from the septic tank. The retaining member can be tubular and can retain the biasing means therewithin, and it too can be sealed to prevent the entry of liquids and solids. Even more preferably, the first and second ends of the sensing probe can have at least one point, such as by being conical, for positively engaging the boundaries of the septic tank.

The sensors could be of a variety of types, each well within the scope of the present invention.

In preferred embodiments, some or all of the sensors could be hemispherical sensor electrodes while, in other embodiments, some or all sensors could comprise ring electrodes. One of the sensors can preferably be employed as a references sensor and can be disposed on the elongate tube to coincide in location with a lower end of an outlet baffle of the septic tank. With this, the locations of the remaining sensors and the material disposed in proximity thereto can be measured based on their distance from the reference sensor.

A tank electronics unit can be coupled to the elongate sensing probe and operably associated with the remote monitor by, for example, an interconnecting cable or any other means, and each of the plurality of sensors can be electrically coupled to the tank electronics unit. Where an interconnecting cable is employed, a cover plate can be provided for being disposed over the interconnecting cable as it exits the septic tank for shielding the interconnecting cable from damage during excavation and the like.

A microcontroller can be operably associated with each of the plurality of sensors for providing them with a high frequency, preferably 10 KHz, alternating current flow. A multiplexer and a synchronous demodulator can be incorporated for multiplexing and demodulating analog voltage signals produced by the current flow to each sensor. Even further, an analog to digital converter can be employed for converting the voltage signals from analog to digital. Also, a means for processing and analyzing each digital voltage signal can be incorporated to determine for each sensor whether the material disposed in proximity thereto is the sedimentary layer, the scum layer, or any liquid zone that may be therebetween.

Preferred embodiments will also include means operably associated with the remote monitor for displaying information representative of whether the material disposed in proximity to each sensor is within the sedimentary layer, the scum layer, or any liquid zone. The means for displaying information can be a visual indicator representative of each sensor, and the visual indicators can be disposed in order corresponding to a location of each sensor along the elongate sensing probe. The means for displaying information and the means for processing and analyzing can cooperate to activate each visual indicator that is disposed adjacent to any liquid zone that is in the septic tank while leaving inactive each visual indicator that is disposed adjacent to either the sedimentary layer or the scum layer. Even more preferably, a distance legend can be disposed adjacent to the visual indicators to denote the distance of the corresponding sensor from the reference sensor, and a thickness legend can be disposed adjacent to the visual indicators to denote the thickness of the sedimentary layer and the scum layer in the septic tank.

It should be appreciated that the remote monitor could comprise a specially designed and constructed device, or it could comprise a personal computer system in cooperation with specially designed software. Even further, where there is a dedicated remote monitor, it can include a data interface connector for enabling a coupling to an external device, such as a personal computer. In any event, the monitoring system can include a flood alarm indicator operably associated with the remote monitor for indicating an abnormally high material level in the septic tank, and a pump-out warning indicator can be operably associated with the remote monitor for alerting a septic tank operator to a need for pumping out material within the septic tank.

It should be understood that, although the present invention is primarily described herein as a system for monitoring the conditions of a septic tank, the invention can find equally advantageous application relative to other materials, possibly disposed in stratified layers, in other containers. Furthermore, one will appreciate that the foregoing discussion broadly outlines the more important features of the invention to enable a better understanding of the detailed description that follows and to instill a better appreciation of the inventor's contribution to the art. Before an embodiment of the invention is explained in detail, it must be made clear that the following details of construction, descriptions of geometry, and illustrations of inventive concepts are mere examples of the many possible manifestations of the invention.

DETAILED DESCRIPTION

As is the case with many inventions, the present invention for a monitoring system and method is subject to a wide variety of embodiments. However, to ensure that one skilled in the art will be able to understand and, in appropriate cases, practice the present invention, certain preferred embodiments of the broader invention revealed herein are described below and shown in the accompanying drawing figures.

Figure 1:
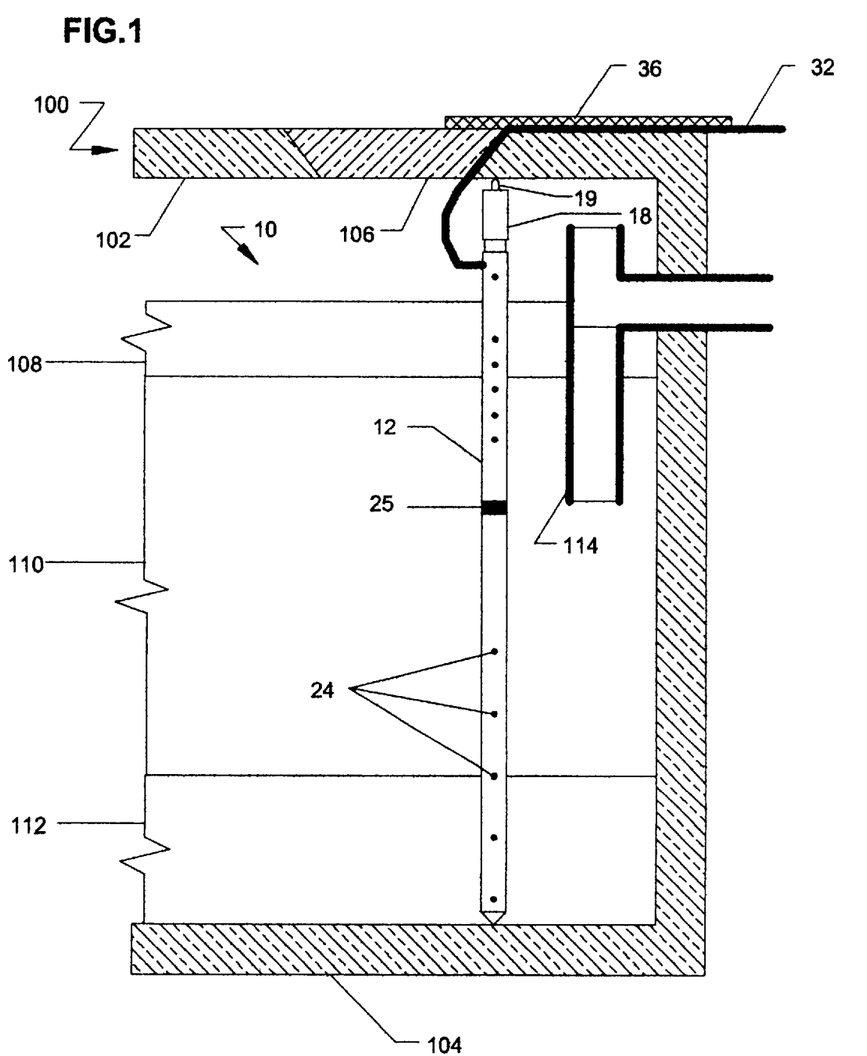
FIG. 1 is a view in front elevation of a sensing probe according to the present invention shown disposed in a typical septic tank.
Figure 3:
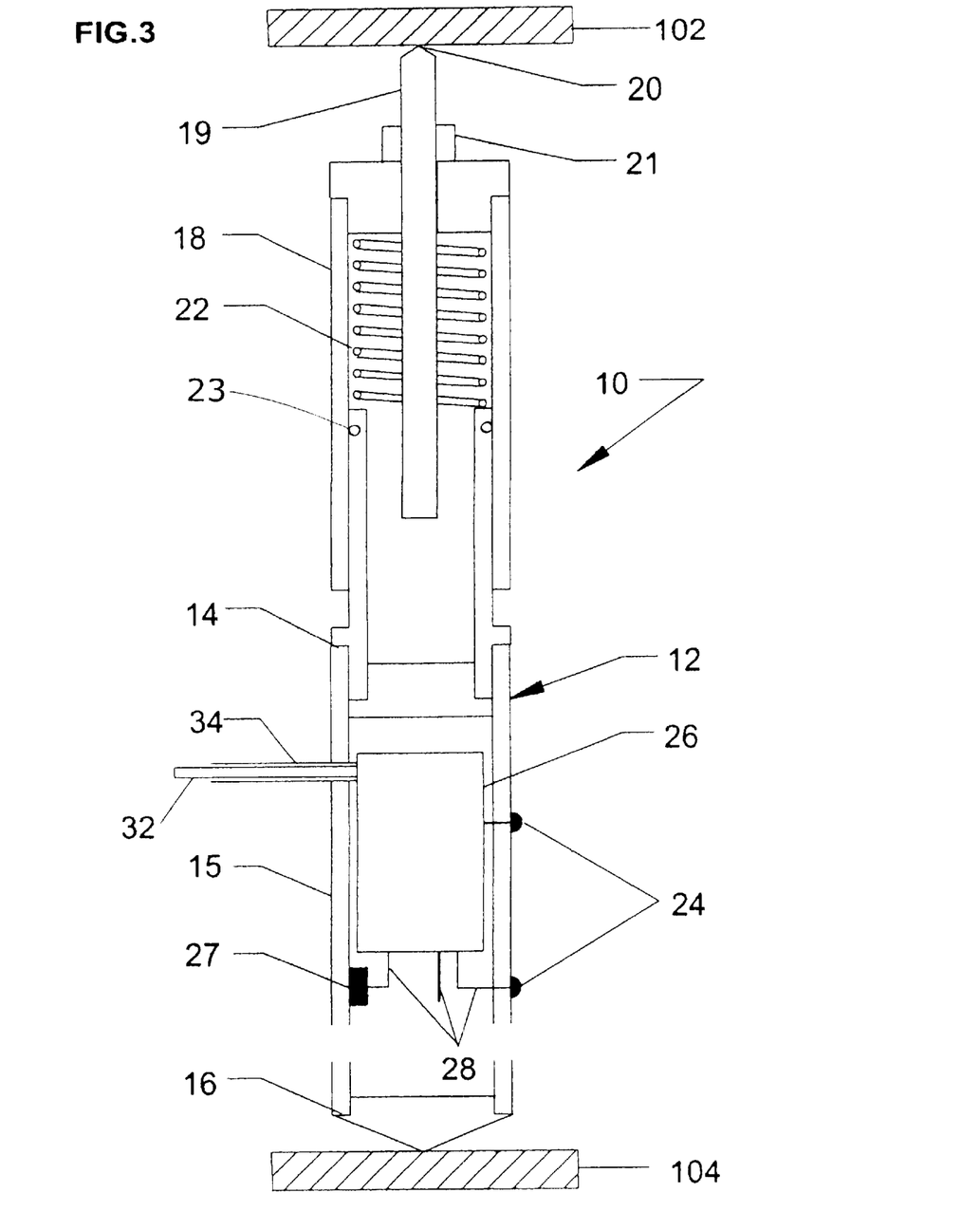
FIG. 3 is a sectioned view in front elevation of a sensing probe of a septic tank monitoring system according to the present invention.

Looking more particularly to the drawings, a preferred embodiment of the present invention in the form of a septic tank monitoring system is indicated generally at 10 in, for example, FIGS. 1 and 3. As will be discussed more fully below, the monitoring system 10 distinguishes between and identifies the location of a sludge or sedimentary layer 112, a scum or cake layer 108, and any intervening liquid zone 110 by measuring the differences in the layers' high frequency electrical conductivity.

The monitoring system 10 is founded on an elongate sensing probe 12, which is depicted in FIG. 1 and in abbreviated form in FIG. 3. In preferred embodiments, the sensing probe 12 is founded on an elongate tube 15 in combination with a retaining member 18. The elongate tube 15 is sealed at its first end 14 and second end 16 to prevent liquids and solids from entering the elongate tube 15 from the septic tank 100. Of course, the elongate tube 15 could be crafted in a wide variety of configurations and from a wide variety of materials. However, forming the elongate tube 15 from a length of plastic pipe, such as polyvinyl chloride (PVC) tubing, may be considered preferable for a plurality of reasons. For example, PVC is tough and durable, resistant to the harsh environment in which it would be placed, and is readily machined, glued, and otherwise manipulated.

The first end 14 of the elongate tube 15 in this exemplary embodiment is slidably engaged with the retaining member 18. More particularly, the elongate tube 15 is matingly received into the retaining member 18, which is also preferably tubular and crafted from PVC. The retaining member 18 has a length adjustment rod 19 with a distal end 20 extending from its sealed body, and an 0-ring 23 is interposed between the inner wall of the retaining member 18 and the outer wall of the elongate tube 15. With this, liquids and particulate matter are prevented from entering the open inner volume of the retaining member 18.

A resiliently compressible member, such as a coiled compression spring 22, is interposed between the distal end 20 of the length adjustment rod 19 of the retaining member 18 and the first end 14 of the elongate tube 15 for biasing the retaining member 18 and thus the length adjustment rod 19. To an extended position. Under this arrangement, the biasing of the retaining member 18 will tend to lock the elongate tube 15 and retaining member 18 in place by forcing the distal end 20 of the length adjustment rod 19 of the retaining member 18 into frictional engagement with what is in this case the inner surface of the top 102 of the septic tank 100 and the second end 16 of the elongate tube 15 into frictional engagement with what is in this case the inner surface of the bottom 104 of the septic tank 100. Advantageously, the position of the length adjustment rod 19 relative to the retaining member 18 can be adjusted by any appropriate means, such as by a lock nut 21 engaged with threading or the like. With this, the effective length of the sensing probe 12 can be adjusted by an adjustment of the distance that the length distal end 20 of the length adjustment rod 19 extends from the retaining member 18 whereby the sensing probe 12 can be adapted to septic tanks 100 and other containers of varying dimensions.

To ensure that the sensing probe 12 will be retained in place most effectively, the distal end 20 of the length adjustment rod 19 and the second end 16 of the elongate tube 15 are pointed, such as by being conical, so that they positively engage the inner surfaces of the top 102 and bottom 104 of the typically cement septic tank 100. With this, the sensing probe 12 can be readily installed and removed relative to a septic tank 100 without a need for fastening hardware or the like. Of course, it will be readily understood that the sensing probe 12 could be oppositely oriented or configured in the septic tank 100.

In this exemplary embodiment, the elongate tube 12 has a plurality of sensors 24 spaced there along. The sensors 24 could be of a variety of types. For example, the sensors 24 could comprise pressure sensors, thermal sensors, or substantially any other type of sensor. However, the preferred sensors 24 comprise relatively small, hemispherical, chemically inert sensor electrodes. As FIG. 1 shows, a common, reference electrode sensor 25 is disposed on the elongate tube 12 to coincide in vertical location with the lower end of the outlet baffle 114 in the septic tank 100. The reference electrode sensor 25 could be a hemispherical electrode or it could preferably be a ring electrode. One of the sensors 24, most likely the uppermost sensor 24 shown in FIG. 3, could be employed as a flood alarm sensor 24 for inducing a flood alarm when reached by, for example, the scum layer 108 so that a user will be apprised that flooding of the septic tank 100 is potentially imminent. A thermistor 27 could be disposed within the elongate tube 12 for providing a temperature indication to enable the monitoring system 10 to account for and accommodate temperature variations as will be discussed more fully below. In any event, the sensors 24, the reference sensor 25, and the thermistor 27 are operably associated with what can be termed a tank electronics unit 26, which will be more filly described below, by any appropriate means. In this embodiment, the sensors 24, the reference sensor 25, and the thermistor 27 are electrically coupled to the tank unit 26 by signal wires 28.

Figure 2:
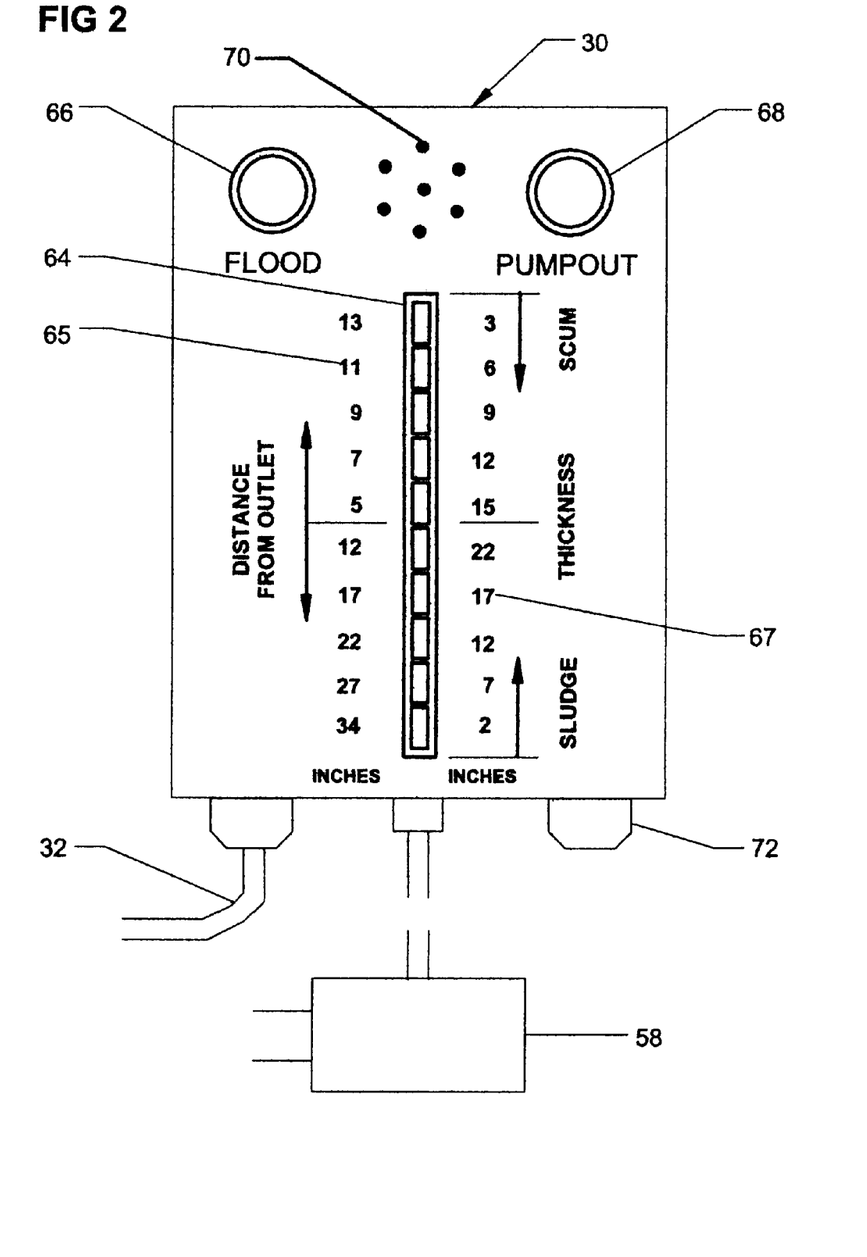
FIG. 2 is a view in front elevation of a remote monitor according to the present invention.
Figure 4:
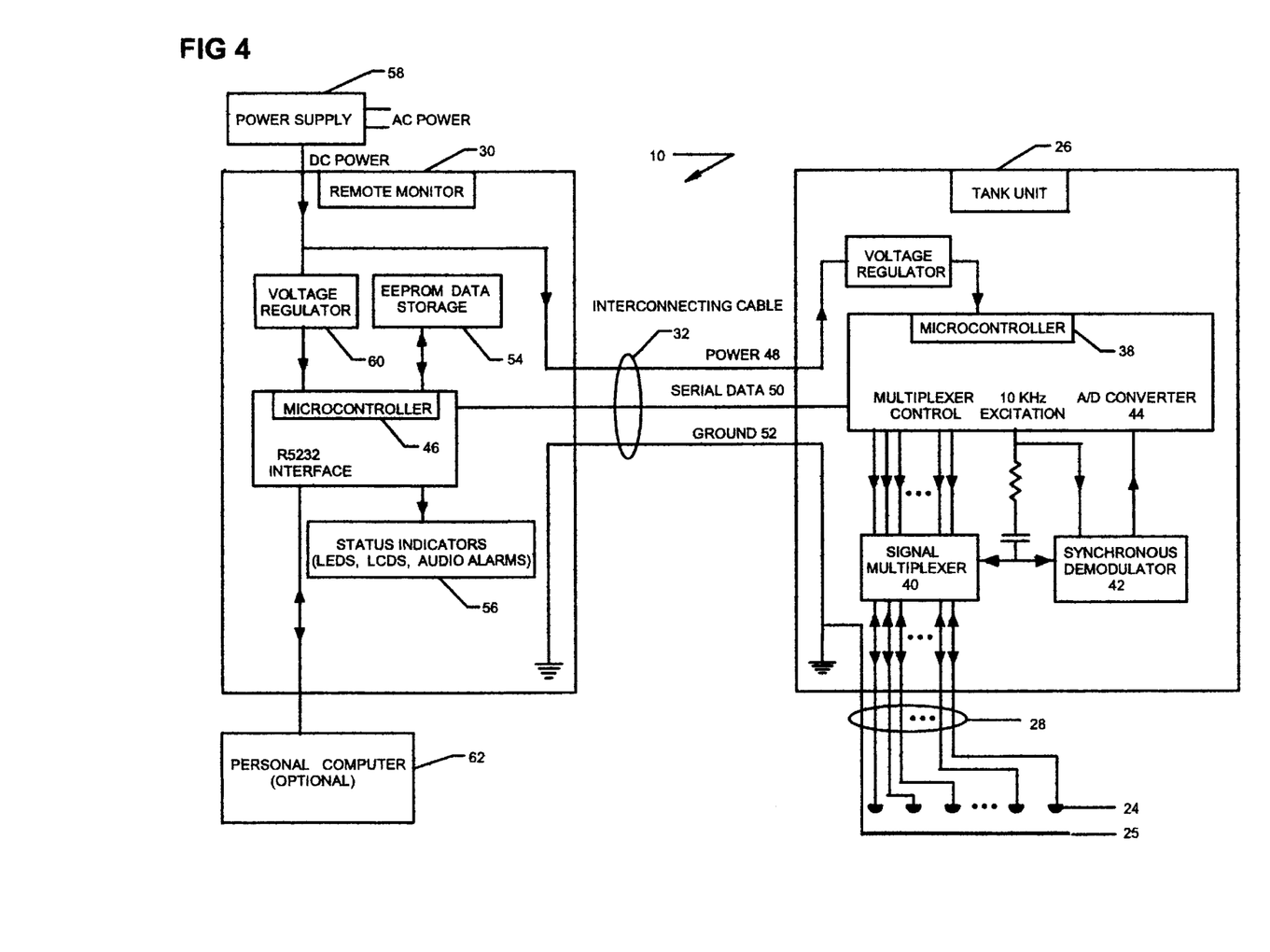
FIG. 4 is a schematic view of an electronic system according to the present invention.

In turn, the tank unit 26 is operably associated with a remote monitor 30, which is depicted in FIG. 2 and schematically shown in FIG. 4. Of course, the tank unit 26 and the remote monitor 30 could be operably associated in a variety of ways including by wireless communication employing cellular, digital, or radiowave systems or by hard-wired connections by cables, ribbon connectors, or the like. However, since the tank unit 26 and the sensing probe 12 are in need of substantially continuous power, it may be preferable to carry out the operable association by an interconnecting cable 32 as it is in this preferred embodiment. In this case, the interconnecting cable 32 is preferably shielded by a shell 34 that is constructed to be flexible, such as by being crafted from flexible PVC material.

With this, as FIG. 1 shows most clearly, the sensing probe 12 can be fixed within the septic tank 100, and the cable 32 can exit the tank 100 through the opening for the tank cover 106 without a need for drilling a hole or otherwise modifying the septic tank 100 to accommodate the cable 32 or the monitoring system 10 in general. If necessary or desirable, the cable 32 can be protected from accidental damage during excavation of the septic tank 100, such as for pumping or inspection, by a cover plate 36. The cover plate 36 could be crafted from a wide variety of materials including, for example, metal, wood, plastic, or rubber and could be square, round, or any other appropriate shape.

Turning more particularly to FIG. 4, one sees a block diagram of the electronics of the monitoring system 10. A microcontroller 38 provides a high frequency, for example 10 KHz, alternating current to the sensor electrodes 24 and 25. In this case, the microcontroller 38 is disposed in the tank unit 26, and the tank unit 26 is disposed within the sensing probe 12. However, it should It be clear that the tank unit 26 could well be mounted externally to the sensing probe 12. The analog voltage signals produced by this current flow through the conducting layers 108, 110, and 112 in the septic tank 100 to the common reference electrode 25 and are multiplexed and demodulated by a multiplexer 40 and a synchronous demodulator 42. The signals are converted from analog to digital form by an A/D converter 44 and sent over the cable 32 to a second microcontroller 46 in the indoor unit 30. In this embodiment, the cable 32 is a three-wire cable with a power wire 48, a serial data wire 50, and a ground wire 52.

At the second microcontroller 46, the signals are stored in memory 54, processed, and forwarded to status indicators 56, such as LED and LCD displays and audio alarms to indicate the condition of the septic tank 100. The audio alarm status indicators 56 can call attention to critical conditions such as the need for a pumping out the septic tank 100 or a flooding of the septic tank 100. A power supply 58 couples the monitoring system 10 to a source of AC power through a voltage regulator 60.

As noted above, the monitoring system 10 includes a temperature sensor, such as a thermistor 27, within the elongate tube 12 for acting as a temperature sensor. With such a thermistor 27 provided, the monitoring system 10 could, with appropriate programming, make necessary corrections for changes in electrical conductivity in the conducting layers 108, 110, and 112. With this, the monitoring system 10 can provide consistently accurate indications of the locations and thicknesses of the conducting layers 108, 110, and 112 notwithstanding variations in environmental temperature.

In certain embodiments, the microcontroller 46 can be firther coupled to a personal computer 62 for providing enhanced input, output, and display capabilities. In such a case, it may be most preferable to employ the personal computer 62 for displaying status information regarding the septic tank 100. Of course, the personal computer 62 could also provide warnings and alarms regarding emergency conditions. With this, it would be entirely possible to have the personal computer 62 perform all the functions of the remote monitor 30 such that the dedicated remote monitor 30 may be considered unnecessary. Just as clearly, the remote monitor 30 and the personal computer 62 could be used to great advantage in combination.

In any event, where a remote monitor 30 is provided, whether in addition to or as an alternative to a personal computer 62, it could have the appearance and structure of the exemplary remote monitor 30 shown in FIG. 2. There, the remote monitor 30 has a divided display means 64, such as an LED array 64, that depicts the location and thickness of the sedimentary layer 112, the cake layer 108 and the liquid zone 110. More particularly, the display means 64 is formed by a series of linearly arranged LEDs, which could, for example, be blue LEDs. Of course, the divided display means 64 could operate in a number of ways. As shown in the present embodiment, one advantageous way is to have each of the plurality of LEDs in the LED array 64 correspond to a sensor 24 or 25 on the elongate tube 12. A distance legend 65 can be disposed to a first side of the LED array 64 to denote the progressively increasing distances of the sensors 24 from the reference sensor 25. A thickness legend 67 can be disposed to a second side of the LED array 64 denoting the thickness of the sedimentary or sludge layer 112 and the cake or scum layer 108. Under this arrangement, the LEDs in the LED array 64 that correspond to sensors 24 or 25 that are disposed in proximity with the liquid zone 110 can be activated while the sensors 24 or 25 that are disposed in proximity with either the sludge or scum layers 112 or 108 can remain inactive. With this, a septic tank operator can readily determine the location and thickness of the sludge layer 112, the scum layer 108, and the liquid zone 110.

The remote monitor 30 further includes a flood alarm indicator 66 that would be activated in the event of an abnormally high water level in the septic tank 100. The flood alarm indicator 66 could simply comprise a light, such as a light emitting diode (LED). The flood alarm indicator 66 could be substantially any color light but might most preferably be red. Also provided on the face of the remote monitor 30 is a pump-out warning indicator 68 for alerting the septic tank operator to a need for pumping out the contents of the septic tank 100. Of course, the pump-out warning indicator 68 also could take a variety of forms but might preferably comprise an LED, which could be orange for more readily differentiating it from the flood alarm indicator 66. Even further, a sonic alarm 70 is included in the remote monitor 30 so that the monitoring system 10 can provide an audible alarm when either the flood alarm indictor 66 or the pump-out warning indicator 68 has been activated.

Advantageously, a data interface connector 72 is provided for coupling the remote monitor 30 to a personal computer 62 or the like. Of course, the data interface connector 72, such as an input/output (I/O) bus, could be of a variety of types including a small computer system interface (SCSI) connector, a universal serial bus (USB) connector, or any other of the multiple types of connectors 72 that would be readily obvious to one of skill in the art after reading this disclosure. In addition to enabling control and display functions to be carried out by the computer 62, the connector 72 would also enable detailed analysis of data, data storage, and transmission of data to alternative locations.

An even further understanding of the uniquely effective and accurate nature of preferred embodiments of the monitoring system 10 disclosed herein can be gained from the detailed analysis of the geometrical and electrical characteristics of the conductivity probe electrode sensors 24 and 25 that can preferably be employed.

1. Electrode Sensors 24 and 25 in a Homogenous Conductor.

Figure 5:
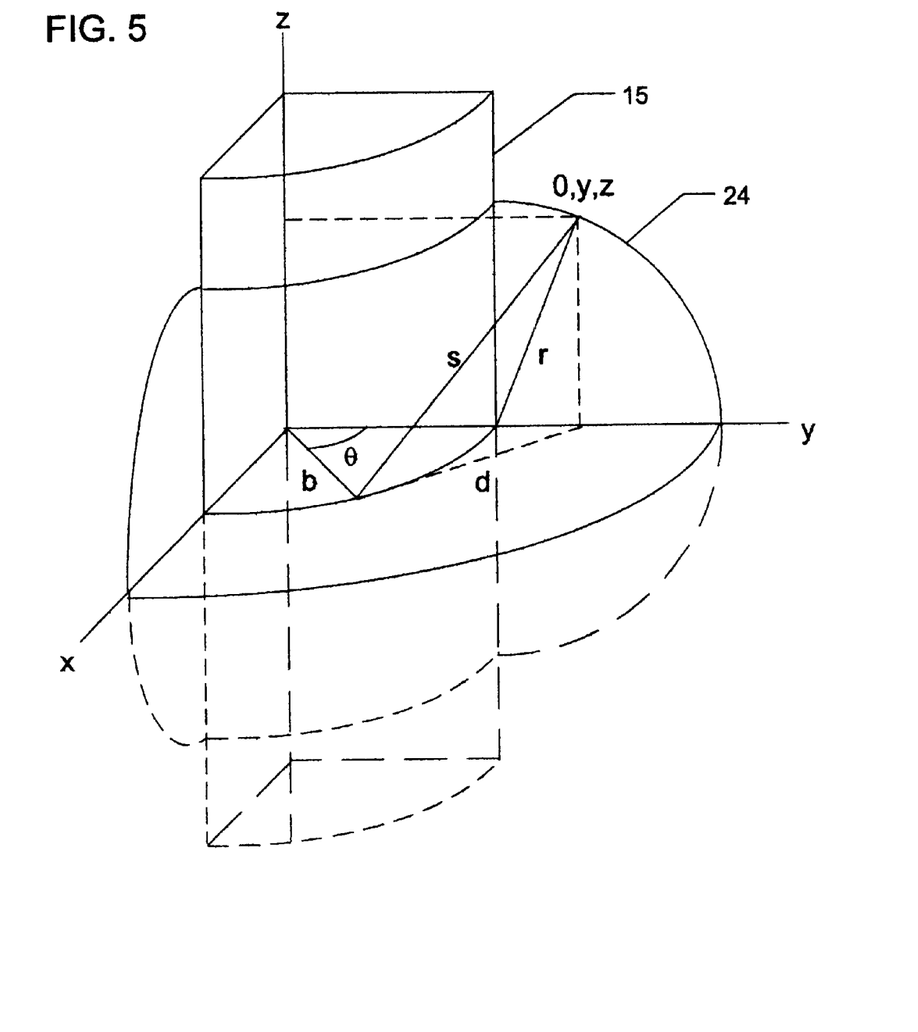
FIG. 5 is a perspective view of a coordinate system for a ring electrode under the present invention.
Figure 6A:
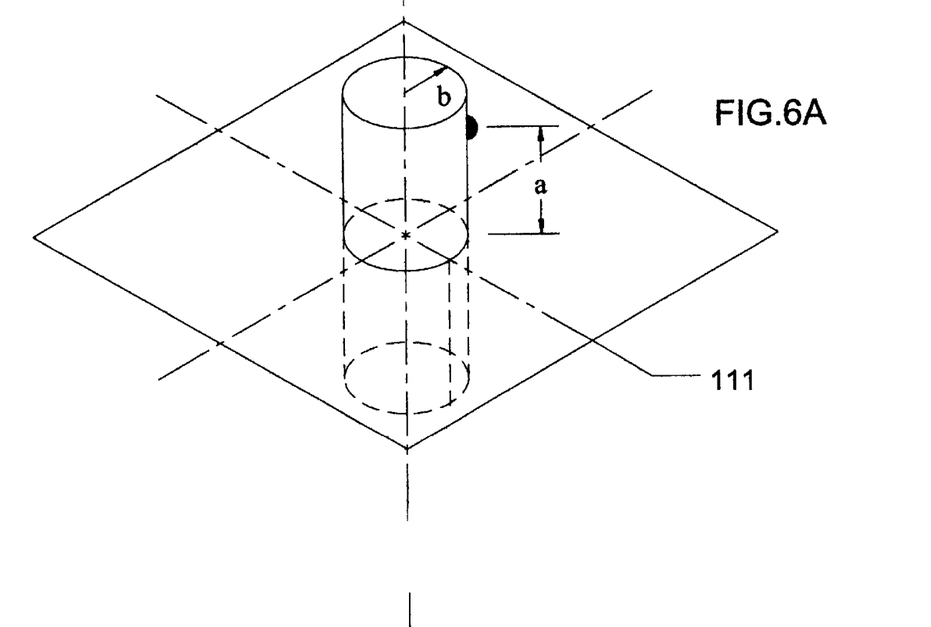
FIG. 6a is a schematic perspective view of a hemispherical electrode arrangement under the present invention.
Figure 6B:
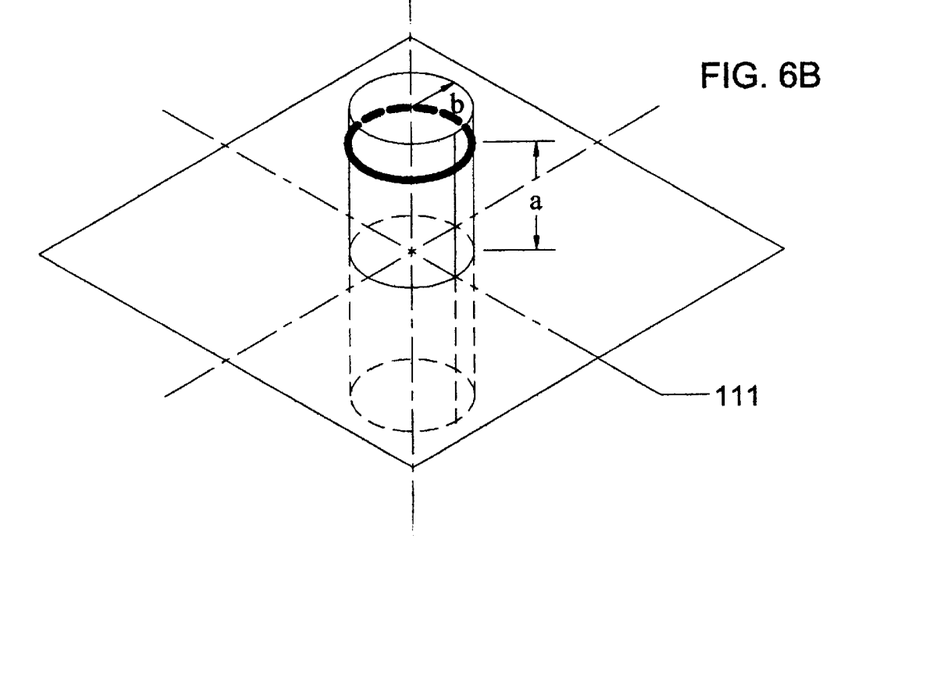
FIG. 6b is a schematic perspective view of a ring electrode arrangement under the present invention.

Case 1a. With reference to the ring electrode coordinate system depicted in FIGS. 5 and to the hemispherical and ring electrode depictions of FIGS. 6A, and 6B, consider first a hemispherical electrode sensor 24 or 25 of radius, r, on the surface of a non-conducting cylinder, such as the elongate tube 15, of radius, b, in a fluid 110 with electrical conductivity, $\sigma$. If I is the current from the electrode sensor 24 or 25 to the fluid 110 and r<<b, the potential of the electrode sensor 24 or 25 will be given by $$V(r)=(I/2\pi\sigma)1/r$$

where we have set the potential of the fluid 110 at infinity equal to zero.

Case 1b. Consider a ring electrode sensor 24 or 25 of radius, r, on the surface of a non-conducting cylinder, such as the elongate tube 15, of radius, b, in a fluid 110 with electrical conductivity, $\sigma$, as shown in FIG. 5. If I is the current from the electrode sensor 24 or 25 to the fluid 110 and r<<b, the potential of the electrode sensor 24 or 25 will be given by $$V(r,b)=(I/2\pi\sigma)F(b,r)$$

where $$F(r,b) = \int_0^{\pi/2} d\theta/\pi\sqrt{r^2 + 4b^2\sin^2\theta}$$

is a Complete Elliptic Integral of the First Kind that can easily be evaluated numerically or approximated by $$F(r,b)=(\ln(\sqrt{1+\rho^{-2}}+1/\rho)+\ln(1+\sqrt{1+(2+\rho^2)^{-1}}+1/\sqrt{(2+\rho^2)}))/\sqrt{2b}$$

where $\rho^2=(r/b)^2/2$. It can be seen that for small values of $\rho$, $F(r,b)\sim-(\ln\rho)/b$, while for large values of $\rho$, $F(r,b)\sim 1/r$.

2. Effect of Deposits.

Conducting material deposited on the surface of an electrode sensor 24 or 25 in a conducting fluid 110 will alter its electrical potential. For a thin homogeneous layer or deposit material of thickness $\delta<<r$, the fractional change in potential for a hemispherical electrode sensor 24 or 25 is given by $$\delta V/V=(\sigma/\sigma_{67}-1)(\delta/r)$$

and the corresponding expression for a ring electrode sensor 24 or 25 is $$\delta V/V=(\sigma/\sigma_\delta-1)(\delta/r)/\ln(2\sqrt{2}b/r)$$

where $\sigma_\delta$ is the conductivity of the deposit layer. From this, it can be seen that for large values of b/r a ring electrode sensor 24 or 25 is significantly less sensitive to deposits than a hemispherical electrode sensor 24 or 25.

3. Electrode in a Stratified Conductor.

Case 3a. If the hemispherical electrode sensor 24 or 25 of Case 1a is located at a height, $\alpha$, above a horizontal boundary 111 at z=0 between two fluids with different conductivities and the axis of the cylinder, such as the elongate tube 15, is vertical as shown in FIG. 6a, then the potential of the electrode 24 or 25 obtained by the method of images is $$V(r, a) = \left(\frac{I}{2\pi(\sigma_1 + \sigma_2)}\right)\left(\left(1 + \frac{\sigma_1}{\sigma_2}\right)\frac{1}{r} + \left(1 - \frac{\sigma_1}{\sigma_2}\right)\frac{1}{2a}\right): a > r$$

$$V(r)=I/\pi(\sigma_1+\sigma_2):a=0$$

$$V(r, a) = \left(\frac{I}{2\pi(\sigma_1 + \sigma_2)}\right)\left(\left(1 + \frac{\sigma_2}{\sigma_1}\right)\frac{1}{r} - \left(1 - \frac{\sigma_2}{\sigma_1}\right)\frac{1}{2a}\right): a < -r$$

where $\sigma_1$ and $\sigma_2$ are the conductivities of the lower and upper fluids respectively.

Case 3b. If the ring electrode 24 or 25 of Case 1b is located at a height, a, above a horizontal boundary 111 at z=0 between two fluids with different conductivities and the axis of the cylinder, such as the elongate tube 15, is vertical as shown in FIG. 6b, then the electrode potential obtained by the method of images is $$V(r, b, a) = \left(\frac{I}{2\pi(\sigma_1 + \sigma_2)}\right)\left(\left(1 + \frac{\sigma_1}{\sigma_2}\right)F(r, b) + \left(1 - \frac{\sigma_1}{\sigma_2}\right)F(2a, b)\right): a > r$$

$$V(r, b, 0) = \left(\frac{I}{\pi(\sigma_1 + \sigma_2)}\right)F(r, b) : a = 0$$

$$V(r, b, a) = \left(\frac{I}{2\pi(\sigma_1 + \sigma_2)}\right)\left(\left(1 + \frac{\sigma_1}{\sigma_2}\right)F(r, b) - \left(1 - \frac{\sigma_1}{\sigma_2}\right)F(2a, b)\right): a < -r$$

4. Interface Resolution Functions.

Figure 7A:
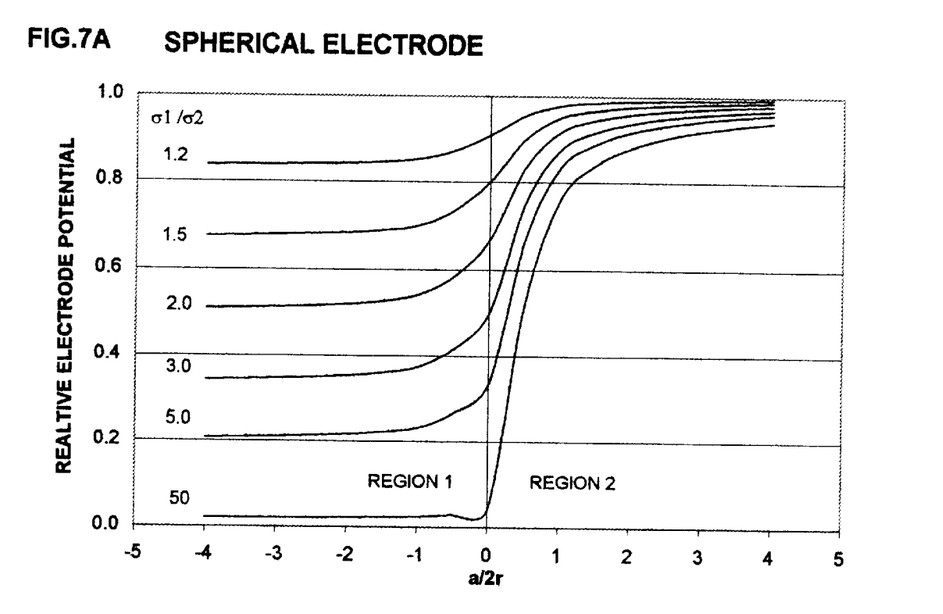
FIG. 7a is a graph of the relative potential of a hemispherical electrode in a stratified fluid conductor as a finction of a/2r for various values of the conductivity ratio $\sigma_1/\sigma_2$.
Figure 7B:
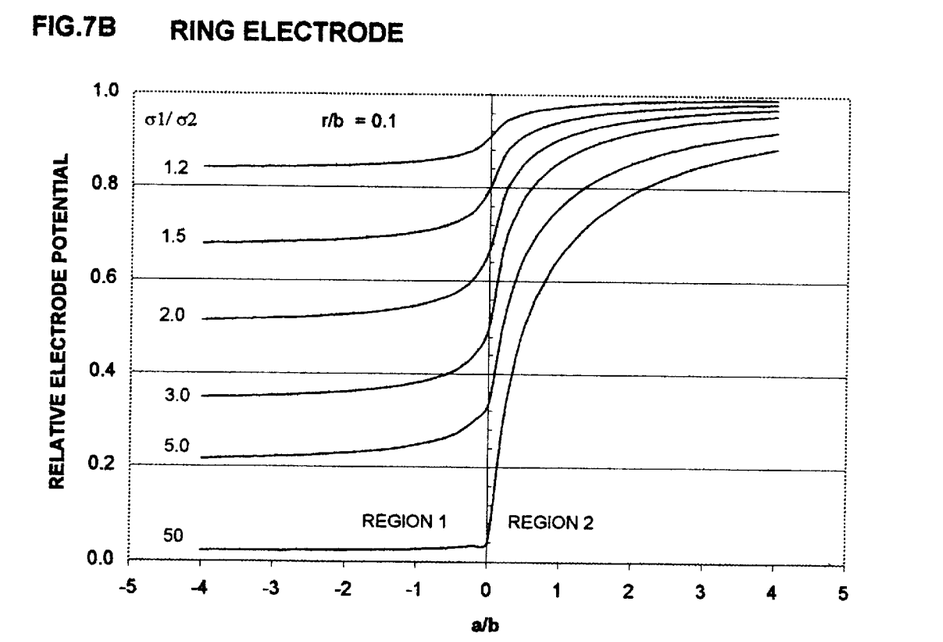
FIG. 7b is a graph of the relative potential of a ring electrode in a stratified fluid conductor as a function of a/2r for various values of the conductivity ratio $\sigma_1/\sigma_2$.

The relative potential of a hemispherical electrode 24 or 25 in a stratified fluid conductor (Case 3a) is shown as a function of a/2r in FIG. 7a for various values of the conductivity ratio $\sigma_1/\sigma_2$. It can be seen that the spatial resolution for such an electrode 24 or 25 is approximately the electrode diameter, 2r. The corresponding relative potential for a ring electrode 24 or 25 (Case 3b) is shown in FIG. 7b. In this case, the spatial resolution is approximately the cylinder radius, b. Since the ring electrode 24 or 25 effectively averages the conductivity over a larger volume of the fluid, it is less sensitive to deposit formation on the electrode 24 or 25 and inhomogeneities in the fluid than the hemispherical electrode 24 or 25. However, it has a lower resolution.

5. Typical Results for a Septic Tank Probe.

Figure 8A:
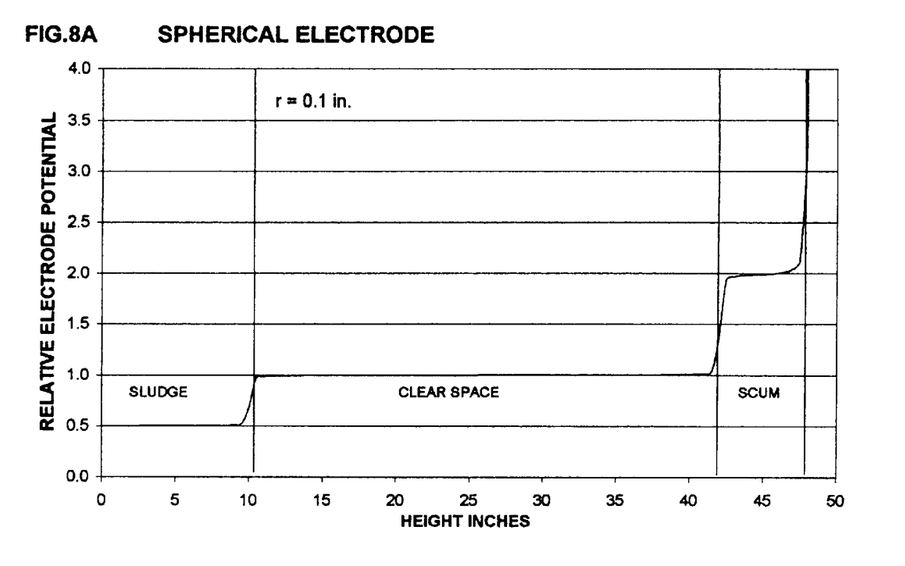
FIG. 8a is a graph of a typical potential curve for a conductivity probe in a septic tank for a hemispherical electrode.
Figure 8B:
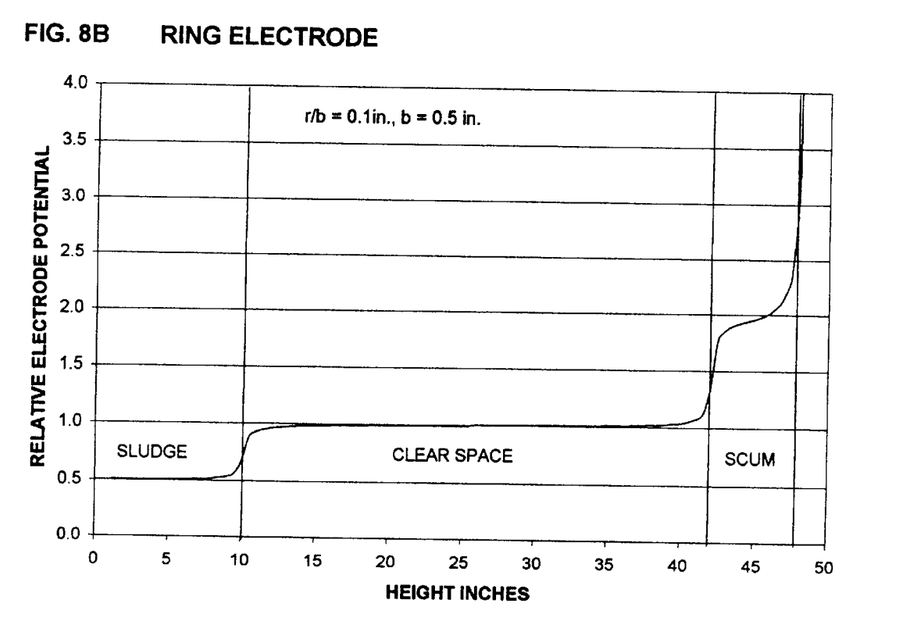
FIG. 8b is a graph of a typical potential curve for a conductivity probe in a septic tank for a ring electrode.

Typical potential curves for a conductivity probe in a septic tank 100 are shown in FIGS. 8a and 8b for both hemispherical and ring electrodes 24 and 25. The thicknesses of the sludge and scum layers 112 and 108 are assumed to be 10 and 6 inches respectively. A typical value of $\sigma_1/\sigma_2=2$ has been assumed for the conductivity ratio of the sludge layer 112 and the liquid zone 110, and a typical value of $\sigma_3/\sigma_2=0.5$ has been assumed for the conductivity ratio of scum layer 108 and liquid zone 110. The previously discussed differences in the resolution of the two electrode geometries can be clearly seen. To be complete, one should appreciate that other electrode geometries such as dipole pairs could also be used to achieve a variety of resolution functions.

With a plurality of preferred embodiments of the invention disclosed, it will be appreciated by one skilled in the art that numerous changes and additions could be made thereto without deviating from the spirit or scope of the invention. This is particularly true when one bears in mind that the presently preferred embodiments merely exemplify the broader invention revealed herein.

Accordingly, it will be clear that those with major features of the invention in mind could craft embodiments that incorporate those major features while not incorporating all of the features included in the preferred embodiments. Therefore, the following claims are intended to define the scope of protection to be afforded the inventors. Those claims shall be deemed to include equivalent constructions insofar as they do not depart from the spirit and scope of the invention.

It must be further noted that a plurality of the following claims may express certain elements as means for performing a specific function, at times without the recital of structure or material. As the law demands, these claims shall be construed to cover not only the corresponding structure and material expressly described in this specification but also equivalents thereof.

I claim as deserving the protection of Letters Patent:

1. A septic tank monitoring system for distinguishing between and identifying the location of a sedimentary layer, a scum layer, and any intervening liquid zone in a septic tank, the septic tank monitoring system comprising:

an elongate sensing probe with a first end and a second end for being disposed in the septic tank;

a plurality of sensors disposed along the sensing probe, the plurality of sensors each including a means for providing a signal that enables a determination of whether the sensor is disposed proximal to the sedimentary layer, the scum layer, or any intervening liquid zone in the septic tank; and a remote monitor for being operably associated with the plurality of sensors wherein the remote monitor has a means for providing a remote indication to a septic tank operator of the location of the sedimentary layer, the scum layer, and any intervening liquid zone in the septic tank based on the signals from the plurality of sensors;

wherein the elongate sensing probe comprises an elongate member and a retaining member slidably associated with the elongate member and a means for biasing the retaining member to an extended position wherein a distal end of the retaining member comprises the first end of the elongate sensing probe and a distal end of the elongate member comprises the second end of the elongate sensing probe whereby the elongate sensing probe can be inserted into and retained within the septic tank by compressing the retaining member relative to the elongate member, orienting the elongate sensing probe in the septic tank, and allowing the retaining member to decompress relative to the elongate tube whereby elongate sensing probe can be frictionally retained in the septic tank with the first end of the elongate sensing probe frictionally engaging a first boundary of the septic tank and the second end of the elongate sensing probe frictionally engaging a second boundary of the septic tank;

whereby the septic tank operator can monitor the contents and condition of the septic tank without a need for excavating and physically inspecting the septic tank.

2. The septic tank monitoring system of claim 1 wherein the retaining member comprises at least a length adjustment member and further comprising a means for adjustable coupling the length adjustment member to the elongate sensing probe for adjusting the effective length of the elongate sensing probe.

3. The septic tank monitoring system of claim 2 wherein the retaining member further comprises a body portion that is slidably associated with the elongate member and wherein the length adjustment member is adjustable coupled to the body portion of the retaining member.

4. The septic tank monitoring system of claim 3 wherein the length adjustment member is adjustable coupled to the body portion of the retaining member by a threaded engagement whereby the length adjustment member can be extended and retracted relative to the body portion by operation of the threaded engagement.

5. The septic tank monitoring system of claim 2 wherein the first and second ends of the elongate sensing probe each have at least one point for positively engaging the boundaries of the septic tank.

6. The septic tank monitoring system of claim 5 wherein the first and second ends of the elongate sensing probe are generally conical.

7. A septic tank monitoring system for distinguishing between and identifying the location of a sedimentary layer, a scum layer, and any intervening liquid zone in a septic tank, the septic tank monitoring system comprising:

an elongate sensing probe with a first end and a second end for being disposed in the septic tank;

a plurality of sensors disposed along the sensing probe, the plurality of sensors each including a means for providing a signal that enables a determination of whether the sensor is disposed proximal to the sedimentary layer, the scum layer, or any intervening liquid zone in the septic tank wherein at least one of the plurality of sensors comprises a hemispherical sensor electrode for providing a potential based on a conductivity of at least one of the sedimentary layer, the scum layer, and/or any intervening liquid zone; and a remote monitor for being operably associated with the plurality of sensors wherein the remote monitor has a means for providing a remote indication to a septic tank operator of the location of the sedimentary layer, the scum layer, and any intervening liquid zone in the septic tank based on the signals from the plurality of sensors;

whereby the septic tank operator can monitor the contents and condition of the septic tank without a need for excavating and physically inspecting the septic tank.

8. The septic tank monitoring system of claim 7 wherein the potential of the hemispherical sensor electrode relative to a horizontal boundary between the scum layer and the liquid zone or between the liquid zone and the sludge layer is determined by the following formulas:

$$V(r, a) = \left(\frac{I}{2\pi(\sigma_1 + \sigma_2)}\right)\left(\left(1 + \frac{\sigma_1}{\sigma_2}\right)\frac{1}{r} + \left(1 - \frac{\sigma_1}{\sigma_2}\right)\frac{1}{2a}\right) : a > r$$

$$V(r) = I/\pi(\sigma_1 + \sigma_2) : a = 0$$

$$V(r, a) = \left(\frac{I}{2\pi(\sigma_1 + \sigma_2)}\right)\left(\left(1 + \frac{\sigma_2}{\sigma_1}\right)\frac{1}{r} - \left(1 - \frac{\sigma_2}{\sigma_1}\right)\frac{1}{2a}\right) : a < -r$$

where α is a height of the hemispherical sensor electrode above the horizontal boundary, r is the radius of the hemispherical sensor electrode, and $\sigma_1$ and $\sigma_2$ are the conductivities of the liquid zone and the scum layer respectively or the sludge layer and the liquid zone respectively.

9. A septic tank monitoring system for distinguishing between and identifying the location of a sedimentary layer, a scum layer, and any intervening liquid zone in a septic tank, the septic tank monitoring system comprising:

an elongate sensing probe with a first end and a second end for being disposed in the septic tank;

a plurality of sensors disposed along the sensing probe, the plurality of sensors each including a means for providing a signal that enables a determination of whether the sensor is disposed proximal to the sedimentary layer, the scum layer, or any intervening liquid zone in the septic tank wherein at least one of the plurality of sensors comprises a ring electrode for providing a potential based on a conductivity of at least one of the sedimentary layer, the scum layer, and/or any intervening liquid zone; and a remote monitor for being operably associated with the plurality of sensors wherein the remote monitor has a means for providing a remote indication to a septic tank operator of the location of the sedimentary layers, the scum layer, and any intervening liquid zone in the septic tank based on the signals from the plurality of sensors;

whereby the septic tank operator can monitor the contents and condition of the septic tank without a need for excavating and physically inspecting the septic tank.

10. The septic tank monitoring system of claim 9 wherein the potential of the ring electrode relative to a horizontal boundary between the scum layer and the liquid zone or between the liquid zone and the sludge layer is determined by the following formulas:

$$V(r, b, a) = \left(\frac{I}{2\pi(\sigma_1 + \sigma_2)}\right)\left(\left(1 + \frac{\sigma_1}{\sigma_2}\right)F(r, b) + \left(1 - \frac{\sigma_1}{\sigma_2}\right)F(2a, b)\right) : a > r$$

$$V(r, b, 0) = \left(\frac{I}{\pi(\sigma_1 + \sigma_2)}\right)F(r, b) : a = 0$$

$$V(r, b, a) = \left(\frac{I}{2\pi(\sigma_1 + \sigma_2)}\right)\left(\left(1 + \frac{\sigma_2}{\sigma_1}\right)F(r, b) - \left(1 - \frac{\sigma_2}{\sigma_1}\right)F(2a, b)\right) : a < -r$$

where α is a height of the ring electrode above the horizontal boundary, r is the radius of the ring electrode, and $\sigma_1$ and $\sigma_2$ are the conductivities of the liquid zone and the scum layer respectively or the sludge layer and the liquid zone respectively.

11. A septic tank monitoring system for distinguishing between and identifying the location of a sedimentary layer, a scum layer, and any intervening liquid zone in a septic tank, the septic tank monitoring system comprising:

an elongate sensing probe with a first end and a second end for being disposed in the septic tank;

a plurality of sensors disposed along the sensing probe, the plurality of sensors each including a means for providing a signal that enables a determination of whether the sensor is disposed proximal to the sedimentary layer, the scum layer, or any intervening liquid zone in the septic tank wherein one of the plurality of sensors comprises a reference sensor whereby locations of remaining sensors and material disposed in proximity thereto can be measured based on a distance of each remaining sensor from the reference sensor; and a remote monitor for being operably associated with the plurality of sensors wherein the remote monitor has a means for providing a remote indication to a septic tank operator of the location of the sedimentary layer, the scum layer, and any intervening liquid zone in the septic tank based on the signals from the plurality of sensors;

whereby the septic tank operator can monitor the contents and condition of the septic tank without a need for excavating and physically inspecting the septic tank.

12. The septic tank monitoring system of claim 11 wherein the reference sensor is disposed on the elongate member to coincide in location with a lower end of an outlet baffle of the septic tank.

13. The septic tank monitoring system of claim 11 wherein the reference sensor comprises a ring electrode and wherein the remaining sensors each comprise hemispherical electrodes longitudinally spaced along the elongate member.

14. A septic tank monitoring system for distinguishing between and identifying the location of a sedimentary layer, a scum layer, and any intervening liquid zone in a septic tank, the septic tank monitoring system comprising:

an elongate sensing probe with a first end and a second end for being disposed in the septic tank;

a plurality of sensors disposed along the sensing probe, the plurality of sensors each including a means for providing a signal that enables a determination of whether the sensor is disposed proximal to the sedimentary layer, the scum layer, or any intervening liquid zone in the septic tank;

a remote monitor for being operably associated with the plurality of sensors wherein the remote monitor has a means for providing a remote indication to a septic tank operator of the location of the sedimentary layer, the scum layer, and any intervening liquid zone in the septic tank based on the signals from the plurality of sensors;

a tank electronics unit coupled to the elongate sensing probe wherein each of the plurality of sensors is electrically coupled to the tank electronics unit and wherein the tank electronics unit is operably associated with the remote monitor wherein the tank electronics unit is operably associated with the remote monitor by an interconnecting cable for traveling from the septic tank to the remote monitor; and a cover plate for being disposed over the interconnecting cable as the interconnecting cable exits the septic tank for shielding the interconnecting cable from damage;

whereby the septic tank operator can monitor the contents and condition of the septic tank without a need for excavating and physically inspecting the septic tank.

15. A septic tank monitoring system for distinguishing between and identifying the location of a sedimentary layer, a scum layer, and any intervening liquid zone in a septic tank, the septic tank monitoring system comprising:

an elongate sensing probe with a first end and a second end for being disposed in the septic tank;

a plurality of sensors disposed along the sensing probe, the plurality of sensors each including a means for providing a signal that enables a determination of whether the sensor is disposed proximal to the sedimentary layer, the scum layer, or any intervening liquid zone in the septic tank; and a remote monitor for being operably associated with the plurality of sensors wherein the remote monitor has a means for providing a remote indication to a septic tank operator of the location of the sedimentary layer, the scum layer, and any intervening liquid zone in the septic tank based on the signals from the plurality of sensors; and a microcontroller operably associated with each of the plurality of sensors for providing each sensor with a high frequency alternating current flow;

whereby the septic tank operator can monitor the contents and condition of the septic tank without a need for excavating and physically inspecting the septic tank.

16. The septic tank monitoring system of claim 15 wherein the high frequency alternating current is approximately 10 KHz.

17. The septic tank monitoring system of claim 15 further comprising a multiplexer and a synchronous demodulator for multiplexing and demodulating analog voltage signals produced by the current flow to each sensor and an analog to digital converter for converting the analog voltage signals to digital voltage signals.

18. The septic tank monitoring system of claim 17 further comprising means for processing and analyzing each digital voltage signal to determine for each sensor whether the material disposed in proximity to the sensor is the sedimentary layer, the scum layer, or any liquid zone within the septic tank and means operably associated with the remote monitor for displaying information representative of whether the material disposed in proximity to each sensor is within the sedimentary layer, the scum layer, or any liquid zone.

19. The septic tank monitoring system of claim 18 wherein the means for displaying information comprises a visual indicator representative of each sensor wherein the visual indicators are disposed on the remote monitor in order corresponding to a location of each sensor along the elongate sensing probe and wherein one of the plurality of sensors comprises a reference sensor whereby the locations of the remaining sensors and the material disposed in proximity thereto can be measured based on the distance of each of the remaining sensors from the reference sensor.

20. The septic tank monitoring system of claim 19 wherein the means for displaying information and the means for processing and analyzing cooperate to activate each visual indicator that is disposed adjacent to any liquid zone that is in the septic tank while leaving inactive each visual indicator that is disposed adjacent to either the sedimentary layer or the scum layer.

21. The septic tank monitoring system of claim 20 further comprising a distance legend disposed adjacent to the visual indicators to denote the distance of the corresponding sensor from the reference sensor.

22. The septic tank monitoring system of claim 20 further comprising a thickness legend disposed adjacent to the visual indicators to denote the thickness of the sedimentary layer and the scum layer in the septic tank.

23. The septic tank monitoring system of claim 22 further comprising a distance legend disposed adjacent to the visual indicators to denote the distance of the corresponding sensor from the reference sensor.

24. The septic tank monitoring system of claim 23 wherein the means for displaying information and the means for processing and analyzing comprise a personal computer.

25. The septic tank monitoring system of claim 20 further comprising a flood alarm sensor and a flood alarm indicator operably associated with the remote monitor for indicating an abnormally high material level in the septic tank.

26. The septic tank monitoring system of claim 20 further comprising a pump-out warning indicator operably associated with the remote monitor for alerting a septic tank operator to a need for pumping out material within the septic tank.

27. The septic tank monitoring system of claim 20 further comprising a data interface connector operably associated with the remote monitor for enabling a coupling of the remote monitor to an external device.

28. A septic tank monitoring system for distinguishing between and identifying the location of a sedimentary layer, a scum layer, and any intervening liquid zone in a septic tank, the septic tank monitoring system comprising:

an elongate sensing probe with a first end and a second end for being disposed in the septic tank;

a plurality of sensors disposed along the sensing probe, the plurality of sensors each including a means for providing a signal that enables a determination of whether the sensor is disposed proximal to the sedimentary layer, the scum layer, or any intervening liquid zone in the septic tank wherein each of the plurality of sensors comprises an electrode for providing a signal representative of the electrical potential of a material disposed adjacent to each sensor; and a remote monitor for being operably associated with the plurality of sensors wherein the remote monitor has a means for providing a remote indication to a septic tank operator of the location of the sedimentary layer, the scum layer, and any intervening liquid zone in the septic tank based on the signals from the plurality of sensors;

whereby the septic tank operator can monitor the contents and condition of the septic tank without a need for excavating and physically inspecting the septic tank.

29. The septic tank monitoring system of claim 28 further comprising a temperature sensor for sensing a temperature within the septic tank and further comprising a means for accounting for a change in electrical potential of the material disposed adjacent to each sensor in response to a change in temperature.

30. A system for distinguishing between and identifying the location of stratified layers in a container, the system comprising:

an elongate sensing probe with a first end and a second end for being disposed in the container wherein the elongate sensing probe comprises an elongate member and a retaining member slidably associated with the elongate member and a means for biasing the retaining member to an extended position wherein a distal end of the retaining member comprises the first end of the elongate sensing probe and a distal end of the elongate member comprises the second end of the elongate sensing probe whereby the elongate sensing probe can be inserted into and retained within the container by compressing the retaining member relative to the elongate member, orienting the elongate sensing probe in the container, and allowing the retaining member to decompress relative to the elongate tube whereby elongate sensing probe can be frictionally retained in the container with the first end of the elongate sensing probe frictionally engaging a first boundary of the container and the second end of the elongate sensing probe frictionally engaging a second boundary of the container;

a plurality of sensors disposed along the sensing probe, the plurality of sensors each including a means for providing a signal that enables a determination of whether the sensor is disposed proximal to a given layer of material in the container; and a remote monitor operably associated with the plurality of sensors wherein the remote monitor has a means for providing a remote indication of the location of layers in the container based on the signals from the plurality of sensors;

whereby a material condition in the container can be perceived.

31. The system of claim 30 wherein the retaining member comprises at least a length adjustment member and further comprising a means for adjustable coupling the length adjustment member to the elongate sensing probe for adjusting the effective length of the elongate sensing probe.

32. A system for distinguishing between and identifying the location of stratified layers in a container, the system comprising:

an elongate sensing probe with a first end and a second end for being disposed in the container;

a plurality of sensors disposed along the sensing probe, the plurality of sensors each including a means for providing a signal that enables a determination of whether the sensor is disposed proximal to a given layer of material in the container wherein at least one of the plurality of sensors comprises a hemispherical sensor electrode for providing a potential based on a conductivity of at least one stratified layer in the container; and a remote monitor operably associated with the plurality of sensors wherein the remote monitor has a means for providing a remote indication of the location of layers in the container based on the signals from the plurality of sensors;

whereby a material condition in the container can be perceived.

33. The system of claim 32 wherein the potential of the hemispherical sensor electrode relative to a horizontal boundary between a first layer of stratified material and a second layer of stratified material is determined by the following formulas:

$$V(r, a) = \left(\frac{I}{2\pi(\sigma_1 + \sigma_2)}\right)\left(\left(1 + \frac{\sigma_1}{\sigma_2}\right)\frac{1}{r} + \left(1 - \frac{\sigma_1}{\sigma_2}\right)\frac{1}{2a}\right) : a > r$$

$$V(r) = I/\pi(\sigma_1 + \sigma_2) : a = 0$$

$$V(r, a) = \left(\frac{I}{2\pi(\sigma_1 + \sigma_2)}\right)\left(\left(1 + \frac{\sigma_2}{\sigma_1}\right)\frac{1}{r} - \left(1 - \frac{\sigma_2}{\sigma_1}\right)\frac{1}{2a}\right) : a < -r$$

where $\alpha$ is a height of the hemispherical sensor electrode above the horizontal boundary, r is the radius of the hemispherical sensor electrode, and $\sigma_1$ and $\sigma_2$ are the conductivities of the first and second layers respectively.

34. A system for distinguishing between and identifying the location of stratified layers in a container, the system comprising:

an elongate sensing probe with a first end and a second end for being disposed in the container;

a plurality of sensors disposed along the sensing probe, the plurality of sensors each including a means for providing a signal that enables a determination of whether the sensor is disposed proximal to a given layer of material in the container The system of claim 33 wherein at least one of the plurality of sensors comprises a ring electrode for providing a potential based on a conductivity of at least one stratified layer in the container; and a remote monitor operably associated with the plurality of sensors wherein the remote monitor has a means for providing a remote indication of the location of layers in the container based on the signals from the plurality of sensors;

whereby a material condition in the container can be perceived.

35. The system of claim 34 wherein the potential of the ring electrode relative to a horizontal boundary between a first layer of stratified material and a second layer of stratified material is determined by the following formulas:

$$V(r, b, a) = \left(\frac{I}{2\pi(\sigma_1 + \sigma_2)}\right)\left(\left(1 + \frac{\sigma_1}{\sigma_2}\right)F(r, b) + \left(1 - \frac{\sigma_1}{\sigma_2}\right)F(2a, b)\right) : a > r$$

$$V(r, b, 0) = \left(\frac{I}{\pi(\sigma_1 + \sigma_2)}\right)F(r, b) : a = 0$$

$$V(r, b, a) =$$

$$\left(\frac{I}{2\pi(\sigma_1 + \sigma_2)}\right)\left(\left(1 + \frac{\sigma_2}{\sigma_1}\right)F(r, b) - \left(1 - \frac{\sigma_2}{\sigma_1}\right)F(2a, b)\right) : a < -r$$

where $\alpha$ is a height of the ring electrode above the horizontal boundary, r is the radius of the ring electrode, and $\sigma_1$ and $\sigma_2$ are the conductivities of the first and second layers respectively.

36. A system for distinguishing between and identifying the location of stratified layers in a container, the system comprising:

an elongate sensing probe with a first end and a second end for being disposed in the container;

a plurality of sensors disposed along the sensing probe, the plurality of sensors each including a means for providing a signal that enables a determination of whether the sensor is disposed proximal to a given layer of material in the container wherein one of the plurality of sensors comprises a reference sensor whereby the locations of remaining sensors and material disposed in proximity thereto can be measured based on a distance of each of remaining sensor from the reference sensor; and a remote monitor operably associated with the plurality of sensors wherein the remote monitor has a means for providing a remote indication of the location of layers in the container based on the signals from the plurality of sensors;

whereby a material condition in the container can be perceived.

37. The system of claim 36 wherein the reference sensor comprises a ring electrode and wherein the remaining sensors each comprise hemispherical electrodes longitudinally spaced along the elongate sensing probe.

38. The system of claim 36 further comprising an electronics unit coupled to the elongate sensing probe wherein each of the plurality of sensors is electrically coupled to the electronics unit and wherein the electronics unit is operably associated with the remote monitor.

39. A system for distinguishing between and identifying the location of stratified layers in a container, the system comprising:

an elongate sensing probe with a first end and a second end for being disposed in the container;

a plurality of sensors disposed along the sensing probe, the plurality of sensors each including a means for providing a signal that enables a determination of whether the sensor is disposed proximal to a given layer of material in the container;

a remote monitor operably associated with the plurality of sensors wherein the remote monitor has a means for providing a remote indication of the location of layers in the container based on the signals from the plurality of sensors; and a microcontroller operably associated with each of the plurality of sensors for providing each sensor with a high frequency alternating current flow;

whereby a material condition in the container can be perceived.

40. The system of claim 39 wherein the high frequency alternating current is approximately 10 KHz.

41. The system of claim 39 further comprising a multiplexer and a synchronous demodulator for multiplexing and demodulating analog voltage signals produced by the current flow to each sensor and an analog to digital converter for converting the analog voltage signals to digital voltage signals and further comprising means for processing and analyzing each digital voltage signal to determine for each sensor whether the material disposed in proximity to the sensor is from a given layer in the container and means operably associated with the remote monitor for displaying information representative of whether the material disposed in proximity to each sensor is from a given layer in the container.

42. The system of claim 41 wherein the means for displaying information comprises a visual indicator representative of each sensor wherein the visual indicators are disposed on the remote monitor in order corresponding to a location of each sensor along the elongate sensing probe and wherein one of the plurality of sensors comprises a reference sensor whereby the locations of the remaining sensors and the material disposed in proximity thereto can be measured based on the distance of each of the remaining sensors from the reference sensor.

43. The system of claim 41 further comprising a distance legend disposed adjacent to the visual indicators to denote the distance of the corresponding sensor from the reference sensor and a thickness legend disposed adjacent to the visual indicators to denote the thickness of layers in the container.

44. The system of claim 39 further comprising a temperature sensor for sensing a temperature within the container and further comprising a means for accounting for a change in electrical potential of the material disposed adjacent to each sensor in response to a change in temperature.

* * * * *